3,004,923
PROCESS AND COMPOSITIONS FOR INHIBITING AND PREVENTING THE FOAMING OF AQUEOUS SYSTEMS

Myron J. Jursich, Chicago, Ill., assignor to Nalco Chemical Company, a corporation of Delaware
No Drawing. Filed Dec. 15, 1958, Ser. No. 780,251
9 Claims. (Cl. 252—321)

This invention relates to a method of inhibiting and preventing the foaming of aqueous systems which normally tend to foam. It also relates to new antifoam compositions.

There are many industrial processes which require the processing of aqueous solutions and suspensions. Frequently, due to the nature of the components in the system, foaming becomes a problem which must be prevented or mitigated if full use of the process is to be obtained. Illustrative types of systems in which foaming occurs are cellulosic suspensions of the type used in the manufacture of paper, sewage, detergents, glue solutions, rosin-size and coatings, water-base latex paint formulations, saponin solutions, and many others with which the art is familiar.

Chemical defoaming agents are generally effective in preventing foaming in several of these systems, but generally it has been necessary to design or "tailor" an antifoam product to specifically handle one limited type of foaming problem. Also, in the manufacture of prior art antifoam compositions, they are usually composed of a blend of several components which must be carefully formulated to provide optimum defoaming efficiency. It would be a valuable contribution to the art if a defoaming substance were available which would operate on a large number of systems which tended to foam and could be simply formulated without using a large number of ingredients. Another valuable property that an antifoam composition should possess is the ability to inhibit and suppress foam when used at low, economical dosages. It, therefore, becomes an object of the invention to provide a new antifoam composition.

Another object is to furnish a process of inhibiting and preventing the foaming of aqueous systems which normally tend to foam.

A further object is to provide an antifoam composition which is simple to use, is effective in low dosages, and is effective in preventing foaming in a large number of systems. Other objects will appear hereinafter.

In accordance with the invention, it has been found that systems which normally tend to foam may be treated to inhibit and prevent such foaming by using as the antifoam agent a defoaming amount of an aliphatic substituted succinic anhydride which contains at least 12 carbon atoms in the aliphatic substituting group. The amount of aliphatic substituted succinic anhydride necessary to act as a defoamer is relatively small and in some cases may be as little as one part per million. Generally, however, from 5 parts per million to 50 parts per million will be adequate to give good foam control and/or foam prevention in most instances. In some cases it may be necessary to use as much as 100 to 200 parts per million, but this is only necessary under extremes of conditions.

Other aliphatic substituted succinic anhydrides may be drawn from a large number of known chemical compositions which are readily available commercially. The most effective aliphatic substituted succinic anhydrides are those having the aliphatic substituent in a straight chain configuration. For some reason, the branched chain aliphatic substituted succinic anhydrides do not perform as efficiently as the straight chain material.

Since aliphatic substituted succinic anhydrides are most frequently prepared by reacting an olefin with maleic anhydride, it is common to find commercial materials containing one or more aliphatic substituted succinic anhydrides containing one or more olefinic linkages. Test work has indicated that the substituted succinic anhydride containing olefinic linkages are the most effective when the aliphatic substituent contains from 12 to 35 carbon atoms, and at least one olefinic linkage is not more than two carbon atoms removed from the carbon atom linking the aliphatic chain to the succinic anhydride. Most preferably, the succinic anhydride is attached to the terminal portion of an aliphatic group containing from 12 to 24 carbon atoms.

Illustrative aliphatic substituted succinic anhydrides useful in the practice of the invention are listed below:

I. Branched tetrapropenyl succinic anhydride

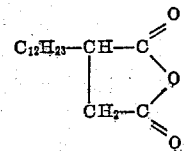

II. Tricosenyl succinic anhydride

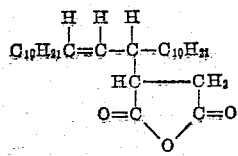

III. Pentatricontenyl succinic anhydride

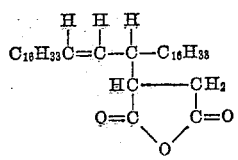

IV. Nonadecenyl succinic anhydride

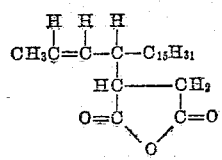

V. n-dodecenyl succinic anhydride [1]

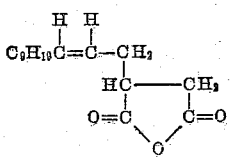

VI. n-dodecenyl succinic anhydride [2]

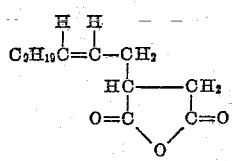

---
[1] Prepared by method described below.
[2] Commercially available.

VII. Branched dodecenyl succinic anhydride

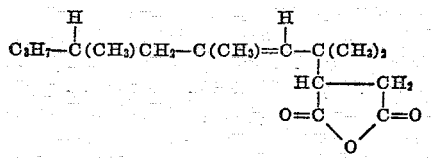

VIII. n-tetradecenyl succinic anhydride

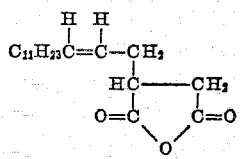

IX. n-hexadecenyl succinic anhydride [1]

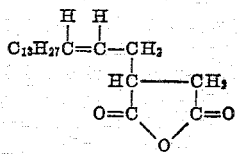

X. n-octadecenyl succinic anhydride [1]

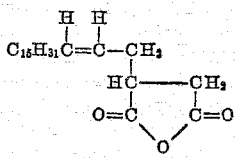

X. n-octadecenyl succinic anhydride [2]

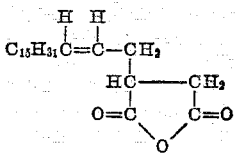

XII. Branched octadecenyl succinic anhydride [1]

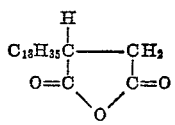

$C_{18}H_{35}$ = internally branched isomeric alkenyl mixture

Compositions numbers V, IX, X, and XII were prepared using the following technique which is listed below in Example I.

*Example I*

Equimolar amounts of a long-chain alpha-olefin and maleic anhydride are placed in a 3-necked flask without a solvent. The flask is equipped with a reflux condenser, thermometer, and a stirrer. The contents are heated and agitated slowly until melted. The heating is continued to reflux 176–196° C., depending on the olefin chain length. Refluxing is continued until the temperature rises sharply to 250–270° C., 2 to 5 hours, depending again on chain length. The liquid may then be filtered, while hot, through glass wool to remove some decomposition products. The liquid usually solidifies above olefin chain length of succinic anhydride.

The aliphatic substituted succinic anhydride may be formulated with an aliphatic hydrocarbon oil of the types commonly used in the preparation of defoaming compositions. Such materials are hydrophobic and may be considered as effective extenders for the aliphatic substituted succinic anhydrides. Included in this group of extenders are such aliphatic oils as mineral seal oil, kerosene, various light aliphatic fuel oils, gas oils, paraffin waxes (which may be melted to produce a liquid), and other similar type materials. To increase the efficacy of the formulations, it is sometimes helpful to incorporate from 1% to 2% by weight of a wetting agent, several types of which are illustrated in the publication "Synthetic Detergents, Up to Date," by John T. McCutcheon, Soap and Sanitary Chemicals, July, August, September, and October 1952. The amount of hydrocarbon oil extender used in preparing formulations will range from about 2% by weight to about 40% by weight of the formulation. The wetting agent described above is preferably non-ionic.

*Example II*

To determine the effectiveness of the compositions of the invention, the following test methods were used.

1. PAPER MILL TEST

A. *Neutral stock.*—18 grams of cellulose facial tissue is reduced to pulp by adding several grams of tissue to 200 milliliters of water and beating. The pulped material is transferred to a one-gallon bottle. The process is repeated until all the stock has been pulped. 50 milliliters of a sulfonated lignin (2% aqueous solution) and 10 milliliters of sodium rosinate (7.2% aqueous solution) are added, and the total diluted to one gallon with Chicago tap water. 200 milliliters of this stock solution is added to the laboratory beater, agitated for 10 seconds, and the foam height noted. Then 0.15 cc. of a 1% dispersion of antifoam in water is added to the stock solution and the mixture agitated for 10 seconds. The mixer is shut off and the surface of the solution is again noted. There should be an immediate breakdown of all foam and the surface of the liquid should appear glassy. Between 0.15 and 0.20 milliliter constitutes a good test; larger amounts indicate an inferior material. Permissible solvent limits are up to 500 parts per million of dioxane, acetone, dimethyl formamide, and 250 parts per million of ethyl alcohol.

B. *Acid stock.*—The acid stock is prepared by shredding 18 grams of cellulose facial tissue in about one-half gallon of Chicago tap water. 50 milliliters of a 2% solution of a sulfonated lignin and 20 milliliters of a 7.2% solution of sodium rosinate are added. The slurry is shaken and water added to make just under one gallon. 27 milliliters of a 4% solution of hydrochloric acid (4 grams of concentrated hydrochloric acid to 96 milliliters water) is added. Enough water is then added to make exactly one gallon of stock with a pH of about 4.5. The stock is then used for tests and results interpreted in a similar manner to the neutral stock. Permissible solvent limits are up to 500 parts per million of dioxane, acetone, dimethyl formamide, and ethyl alcohol.

C. *Protein extract stock.*—200 grams of soya protein and 3800 cc. of 0.1% sodium hydroxide is stirred at 35° C. for one hour. This is filtered through 100 mesh screen to remove the insolubles. 150 milliliters of this stock solution is placed in a laboratory mixer and stirred for 5 seconds. 0.20 milliliter (0.13%) of the antifoam agent are added and the mixture again stirred for 20 seconds. The length of time necessary for the complete disappearance of the foam is noted to be less than 4 minutes. Permissible solvent limits for the protein are 1.3% dimethyl formamide, 1.3% acetone, or less than 0.65% ethyl alcohol.

D. *Detergent stock.*—0.5 gram of dodecyl benzene sodium sulfonate (60% solution) are dissolved in 3 liters of Chicago tap water. 100 milliliters of this solution and 10 parts per million of the antifoam agent (0.1 cc. of a 1% emulsion or dispersion) to a 250-milliliter glass-stoppered graduate. The graduate and solution are shaken fairly vigorously twenty times. Initial foam heights are noted immediately and final foam heights are noted after thirty seconds. If the foam decay to 100 milliliters is less than 30 seconds, the time required to reach the 110-milliliter mark is noted. Permissible solvent limits for deter- ---
[1] Prepared by method described below.
[2] Commercially available.

gent are 500 parts per million of acetone, dioxane, ethyl alcohol, and dimethyl formamide.

E. *Saponin Stock.*—1.5 grams of saponin is dissolved in 3 liters of Chicago tap water. 3 milliliters of concentrated hydrochloric acid is added to bring the pH to approximately 2. The testing procedure is the same as that described in Detergent Stock above. Permissible solvent limits for this system are 5000 parts per million dimethyl formamide, dioxane, and acetone, and 2500 parts per million of ethyl alcohol.

The test solvent for testing the compositions as oil dispersions consists of 5 parts of octylphenol polyether (octyl phenol reacted with 7 to 8 moles ethylene oxide), 20 parts cyclohexanol, and 65 parts mineral seal oil. Ten parts by weight of the compound to be tested is dissolved in this mixture.

Table I below shows the effectiveness of the several compositions of the invention when tested on the systems described above. The table is arranged so that a value of 10 is equivalent to a commercial process antifoam of the following composition:

| Ingredients: | Percent by weight |
|---|---|
| Lecithin | 21.8 |
| Ucon LB 1715 (Carbide & Carbon Chemicals Corporation) | 8.7 |
| Polyoxyethylene Glycol 400 Dilaurate | 8.7 |
| Kerosene | 13 |
| Mineral seal oil | 47.8 |

The above composition is described in detail in Jursich U.S. Patent 2,727,009.

TESTED IN AN OIL FORMULATION

| Composition Number | Paper Stock | | Detergent | Protein | Saponin |
|---|---|---|---|---|---|
| | pH 4.5 | pH 7.0 | | | |
| II | 20 | >50 | >50 | | >50 |
| III | 30 | >50 | >50 | | >50 |

TESTED AS AQUEOUS DISPERSIONS

| II | >50 | >50 | 10 | >100 | >50 |
|---|---|---|---|---|---|
| III | >50 | >50 | >100 | >100 | >50 |
| V | 10 | >70 | 50 | >100 | 10 |
| VI | 10 | 20 | | | |
| VII | >50 | >50 | | | |
| VIII | 20 | 35 | 10 | >100 | 10 |
| IX | 15 | 50 | 10 | >100 | 5 |
| X | 3 | 50 | >100 | >100 | >50 |
| XI | 5 | 35 | >100 | >100 | 10 |
| XII | 20 | >50 | 15 | | |

When the aliphatic substituted succinic anhydrides are used to treat aqueous systems, hydrolysis occurs, producing the free acid. Thus it will be understood that in many defoaming situations the acid may be considered as the equivalent of the anhydride for purposes of this invention.

Several short chain alcohol esters of the above anhydrides were prepared and tested, but their efficacy as defoaming agents was considered as being inferior to either the anhydride or the acid.

Having thus described my invention, it is claimed as follows:

1. The process of inhibiting and preventing the foaming of aqueous systems which normally tend to foam which comprises adding to such systems from one to 500 parts per million of an aliphatic olefinic hydrocarbon substituted succinic anhydride which contains from 12 to 35 carbon atoms in the aliphatic group.

2. The process of inhibiting and preventing the foaming of aqueous systems which normally tend to foam which comprises adding to such systems from one to 500 parts per million of a straight chain aliphatic olefinic hydrocarbon substituted succinic anhydride which contains from 12 to 35 carbon atoms in the aliphatic group.

3. The process of inhibiting and preventing the foaming of aqueous system which normally tend to foam which comprises adding to such systems from one to 500 parts per million of an aliphatic olefinic hydrocarbon substituted succinic anhydride which contains from 12 to 35 carbon atoms in a straight chain aliphatic group and has at least one olefinic linkage not more than 2 carbon atoms removed from the carbon atom linking the aliphatic chain to the succinic anhydride.

4. The process of inhibiting and preventing the foaming of aqueous systems which normally tend to foam which comprises adding to such systems from one part per million to 500 parts per million of an aliphatic olefinic hydrocarbon substituted succinic anhydride which contains from 12 to 24 carbon atoms in a straight chain aliphatic group which is connected to the succinic anhydride by an olefinic linkage, not more than 2 carbon atoms removed from the carbon atom linking the aliphatic chain to the succinic anhydride.

5. The process of inhibiting and preventing the foaming of aqueous dispersions of cellulosic materials which comprises adding to such systems from one to 500 parts per million of an aliphatic olefinic hydrocarbon substituted succinic anhydride which contains from 12 to 35 carbon atoms in the aliphatic group.

6. A defoaming composition useful in inhibiting and preventing foaming in aqueous systems which comprises a major portion of an aliphatic hydrocarbon oil and from 2% to 40% by weight of an aliphatic hydrocarbon substituted succinic anhydride which contains from 12 to 35 carbon atoms in the aliphatic group.

7. The defoaming composition of claim 6 wherein the aliphatic group is a straight chain hydrocarbon group.

8. The defoaming composition of claim 6 wherein the aliphatic group is straight chain, and has at least one olefinic linkage not more than 2 carbon atoms removed from the carbon atom linking the aliphatic chain to the succinic anhydride.

9. The defoaming composition of claim 6 wherein the aliphatic group is straight chain, contains from 12 to 24 carbon atoms in chain length, and is connected to the succinic anhydride by an olefinic linkage, not more than 2 carbon atoms removed from the carbon atom linking the aliphatic chain to the succinic anhydride.

References Cited in the file of this patent

UNITED STATES PATENTS

| 2,055,456 | Eichwald | Sept. 22, 1936 |
|---|---|---|
| 2,133,734 | Moser | Oct. 18, 1938 |
| 2,328,551 | Gunderson | Sept. 7, 1943 |
| 2,430,858 | Borsoff et al. | Nov. 18, 1947 |
| 2,748,086 | Monson | May 29, 1956 |
| 2,868,734 | Castro et al. | Jan. 13, 1959 |

OTHER REFERENCES

Chemical Industries, May 1949, "Chemical Antifoaming Agents," by Ross, pages 757–759.